(12) United States Patent
Chang

(10) Patent No.: US 12,555,846 B2
(45) Date of Patent: Feb. 17, 2026

(54) BATTERY DEVICE HAVING THERMAL PROTECTION MECHANISM

(71) Applicant: STL Technology Co., Ltd., Kaohsiung (TW)

(72) Inventor: Cooper Chang, Kaohsiung (TW)

(73) Assignee: STL TECHNOLOGY CO., LTD., Kaohsiung (TW)

( * ) Notice: Subject to any disclaimer, the term of this patent is extended or adjusted under 35 U.S.C. 154(b) by 554 days.

(21) Appl. No.: 18/077,780

(22) Filed: Dec. 8, 2022

(65) Prior Publication Data

US 2023/0344036 A1    Oct. 26, 2023

(30) Foreign Application Priority Data

Apr. 26, 2022 (TW) .................................. 111115896

(51) Int. Cl.
| | |
|---|---|
| *H01M 10/6568* | (2014.01) |
| *H01M 10/613* | (2014.01) |
| *H01M 10/625* | (2014.01) |
| *H01M 50/204* | (2021.01) |
| *H01M 50/233* | (2021.01) |

(52) U.S. Cl.
CPC ..... *H01M 10/6568* (2015.04); *H01M 10/613* (2015.04); *H01M 10/625* (2015.04); *H01M 50/204* (2021.01); *H01M 50/233* (2021.01)

(58) Field of Classification Search
CPC ........... H01M 10/6568; H01M 10/613; H01M 10/625; H01M 50/204; H01M 50/233; H01M 10/643; H01M 10/647; H01M 10/653; H01M 10/6553; H01M 10/6554; H01M 10/6555; H01M 10/6556; H01M 10/6557; H01M 10/6567; H01M 50/209; H01M 50/211; H01M 50/249; H01M 50/383; H01M 50/213; Y02E 60/10

See application file for complete search history.

(56) References Cited

U.S. PATENT DOCUMENTS

| | | | | |
|---|---|---|---|---|
| 2011/0005781 A1* | 1/2011 | Yasui | .................. | H01M 10/486 169/54 |
| 2019/0077276 A1* | 3/2019 | Capati | ................ | H05K 7/20872 |
| 2022/0238936 A1* | 7/2022 | Dunn | .................. | H01M 10/643 |

* cited by examiner

*Primary Examiner* — Muhammad S Siddiquee
(74) *Attorney, Agent, or Firm* — HDLS IPR SERVICES; Chun-Ming Shih

(57) ABSTRACT

The disclosure provides a battery device comprising a plurality of battery cells and at least one heat dissipation container. The heat dissipation container includes a frame and two thin films. The frame includes a perforation portion. The thin films are connected to the frame, and cover the perforation portion of the frame to form an enclosed space between the thin films and the frame. A liquid of water or aqueous solution is placed in the enclosed space. A bottom of each of the battery cells is adjacent to the corresponding thin film of the heat dissipation container. When the temperature of one of the battery cells is too high, the thin film of the heat dissipation container will damage to generate a broken hole. Then, the liquid will spray out of the heat dissipation container, and contact the battery cell to reduce the temperature of the battery cell.

10 Claims, 9 Drawing Sheets

BATTERY DEVICE HAVING THERMAL PROTECTION MECHANISM

This non-provisional application claims priority claim under 35 U.S.C. § 119(a) on Taiwan Patent Application No. 111115896 filed Apr. 26, 2022, the entire contents of which are incorporated herein by reference.

FIELD OF THE INVENTION

The disclosure relates to a battery device having thermal protection mechanism, which can quickly reduce the temperature of battery cell in thermal runaway, and avoid that the thermal runaway is be propagated to other battery cells, effectively.

BACKGROUND

Rechargeable battery, for example, nickel-metal hydride battery, nickel-cadmium battery, lithium-ion battery, etc., can be recharged and used repeatedly, and widely applied to electronic products, home appliances, or electric vehicles.

Besides, with the development of industry and the rising awareness of environmental protection, the problems of air pollution and global warming have been paid more and more attention. At present, each of countries is gradually formulating relevant regulations to promote and develop the electric vehicle industry. It is proposed to ban the sale of gasoline-powered vehicles after a certain period of time so as to reduce the air pollution caused by means of transportation in the metropolitan area.

Rechargeable battery is one of the important technologies to the development of the electric vehicle industry. How to increase the charging capacity of the rechargeable battery, shorten the charging time of the rechargeable battery, and improve the safety of the rechargeable battery are the key for the promotion and development of the electric vehicle industry. Lithium-ion battery has the advantages of high energy density, high output power, no memory effect, low self-discharge, wide operating temperature range and fast charging and discharging speed, and becomes the main rechargeable battery used in electric vehicles.

Generally, a plurality of the battery cells are connected in series or parallel to form a battery pack, which can output a voltage required by an electronic product. However, when one of the battery cells in the battery pack fails and therefore generates a short circuit, the short-circuited battery cell will be charged by a large current provided by other battery cells, and thereby the temperature of the short-circuited battery cell is risen abnormally. When the temperature of the short-circuited battery cell exceeds a temperature that an isolation layer inside the short-circuited battery cell can withstand, the isolation layer of the short-circuited battery cell will be dissolved so that the melting or exploding happens in the short-circuited battery cell.

A high temperature generated by the failed battery cell or an electrolyte sprayed out of the failed battery cell will be transmitted to other battery cells or transmitted to conductive sheets used to connect the battery cells, so that the temperatures of the other battery cells or the conductive sheets rise abnormally, and further the thermal runaway is happened in the whole battery pack.

SUMMARY

In order to solve the above problems faced by the prior art, the disclosure provides a battery device having thermal protection mechanism, which comprises a plurality of battery cells and at least one heat dissipation container. The heat dissipation container comprises a frame and at least one thin film. The frame comprises a perforation portion or a recessed portion. The thin film is connected to the frame, and used for covering the perforation portion or the recessed portion to form an accommodating space between the frame and the thin film.

A bottom or a positive electrode of each of the battery cells is against the thin film. When the temperature of the battery cell exceeds a temperature to be withstood, for example, 160° C. to 200° C., the thin film of the heat dissipation container will damage to generate a broken hole. Besides, the heat dissipation container is provided at inside thereof with a liquid of water or aqueous solution. The liquid flows out of the broken hole on the thin film, and then sprays on the battery cells in the thermal runaway or the high temperature so that the temperatures of the battery cells can be reduced to avoid the thermal runaway to be propagated to other normal battery cells.

The liquid in the enclosed space of the heat dissipation container is water or aqueous solution that is having a higher thermal stability and specific heat. The water or the aqueous solution sprays out of the heat dissipation container, and sprinkles on the battery cells to reduce the temperature of the battery cells in the thermal runaway, effectively. The heat of vaporization of water is 40.8 kJ/mol, which is equivalent to 2266 kJ/kg, about 5.4 times of the energy required to heat water from 0° C. to 100° C. Therefore, when the water is heated to a boiling point by the battery cells in the thermal runaway and evaporated from a liquid state to a gaseous state, it can absorb a large amount of heat generated by the battery cells in thermal runaway to greatly reduce the temperature of the battery cells in thermal runaway.

When the thin film of the heat dissipation container has broken, part of the water will sprays out of the heat dissipation container, and the rest of the water will be remained in the heat dissipation container. The liquid water or vaporized water sprayed out of the heat dissipation container will directly sprinkle on the battery cells so as to quickly reduce the temperature of the battery cells in the thermal runaway. The water that remains in the heat dissipation container will continue to absorb the temperature of the battery cells in the thermal runaway. When the temperature of the water that remains in the heat dissipation container is high than the boiling point, it will evaporate into water vapor, and absorb a lot of heat generated by the battery cells in thermal runaway, so as to reduce the temperature of the battery cells, continuously, until the water remained in the heat dissipation container is exhausted.

It is one objective of the disclosure to provide a battery device having a thermal protection mechanism. The thermal protection mechanism does not require to determine whether the battery cells occurs thermal runaway by measuring the temperature of the battery cells, and therefore does not need to be equipped with temperature sensors and the temperature detection circuits. Specifically, the thermal protection mechanism of the disclosure disposes the thin film on the frame by welding or soldering to form an enclosed space between the thin film and the frame, and places the water into the enclosed space. Accordingly, the disclosure provides an inexpensive, safe, and stable battery device, which can not only achieve the purpose of preventing the thermal runaway of the battery device, but also decrease the hardware cost required by the thermal protection mechanism.

Besides, the battery cells are connected in series or in parallel via a plurality of conductive sheets to form a battery module. A temperature difference will generate on both sides of the battery module during the charging or the discharging. The battery module is provided with a hot side, and a cold side. The heat on both the hot side and the cold side of the battery module can be transferred to the heat dissipation container via a means of heat conduction to generate a temperature difference on both sides of the heat dissipation container. Afterwards, the liquid in the enclosed space of the heat dissipation container will generate convection because of the temperature difference so as to balance the temperature of the hot side and the cold side of the battery module.

To achieve the above objective, the present disclosure provide a battery device having thermal protection mechanism, comprising: a plurality of battery cells, wherein each of the plurality of battery cells is provided with two bottom surfaces and a lateral surface located between the two bottom surfaces; at least one heat dissipation container, adjacent to the plurality of battery cells, comprising: a frame comprising at least one perforation portion or a recessed portion; at least one thin film, connected to the frame, and used for covering the at least one perforation portion or the recessed portion so as to form an enclosed space between the at least one thin film and the frame, wherein the at least one thin film is adjacent to at least one of the two bottom surfaces of each of the plurality of battery cells; and a liquid placed in the enclosed space of the at least one heat dissipation container, wherein the liquid is water or aqueous solution.

The present disclosure provide a battery device having thermal protection structure, comprising: a plurality of battery cells, wherein each of the plurality of battery cells is provided with two bottom surfaces and a lateral surface located between the two bottom surfaces; at least one heat dissipation container, adjacent to the plurality of battery cells, comprising: a frame comprising at least one perforation portion; two thin films, connected to the frame, and used for covering the at least one perforation portion to form an enclosed space between the two thin films and the frame, wherein the two thin films contact the lateral surfaces of the plurality of battery cells; and a liquid placed in the enclosed space of the at least one heat dissipation container, wherein the liquid is water or aqueous solution.

In one embodiment of the disclosure, the frame is provided with a first surface, a second surface, and a side surface connected to the first surface and the second surface; the number of the at least one thin film is two; the two thin films are connected to the first surface and the second surface of the frame, respectively.

In one embodiment of the disclosure, at least one connecting bracket is connected to the frame, the enclosed space formed between the frame and the at least one thin film is divided into a plurality of accommodating spaces via the at least one connecting bracket.

In one embodiment of the disclosure, the connecting bracket is provided with a concave portion or a connection hole thereon, and communicated with the plurality of accommodating spaces located at two sides of the at least one connecting bracket via the concave portion or the connection hole.

In one embodiment of the disclosure, at least one heat conduction unit is located between the lateral surfaces of the plurality of adjacent battery cells, the at least one heat conduction unit is against the connecting bracket, the plurality of battery cells are against the plurality of accommodating spaces.

In one embodiment of the disclosure, the plurality of battery cells are connected in series or parallel via a plurality of conductive sheets, which are located between the bottom surfaces of the plurality of battery cells and the at least one thin film of the at least one heat dissipation container.

In one embodiment of the disclosure, the thin film comprises at least one metal layer and at least one plastic layer.

In one embodiment of the disclosure, a plurality of raised portions are configured on the first surface and the second surface of the frame, and a recessed portion is existed between the adjacent raised portions; one of the two thin films is connected to the first surface of the frame and the raised portions on the first surface of the frame, and the other thin film is connected to the second surface of the frame and the raised portions on the second surface of the frame.

In one embodiment of the disclosure, each of the plurality of battery cells is located in the corresponding recessed portion, each of the raised portions of the at least one heat dissipation container is located between the plurality of adjacent battery cells.

DETAILED DESCRIPTION OF THE PREFERRED EMBODIMENTS

Figure 1:
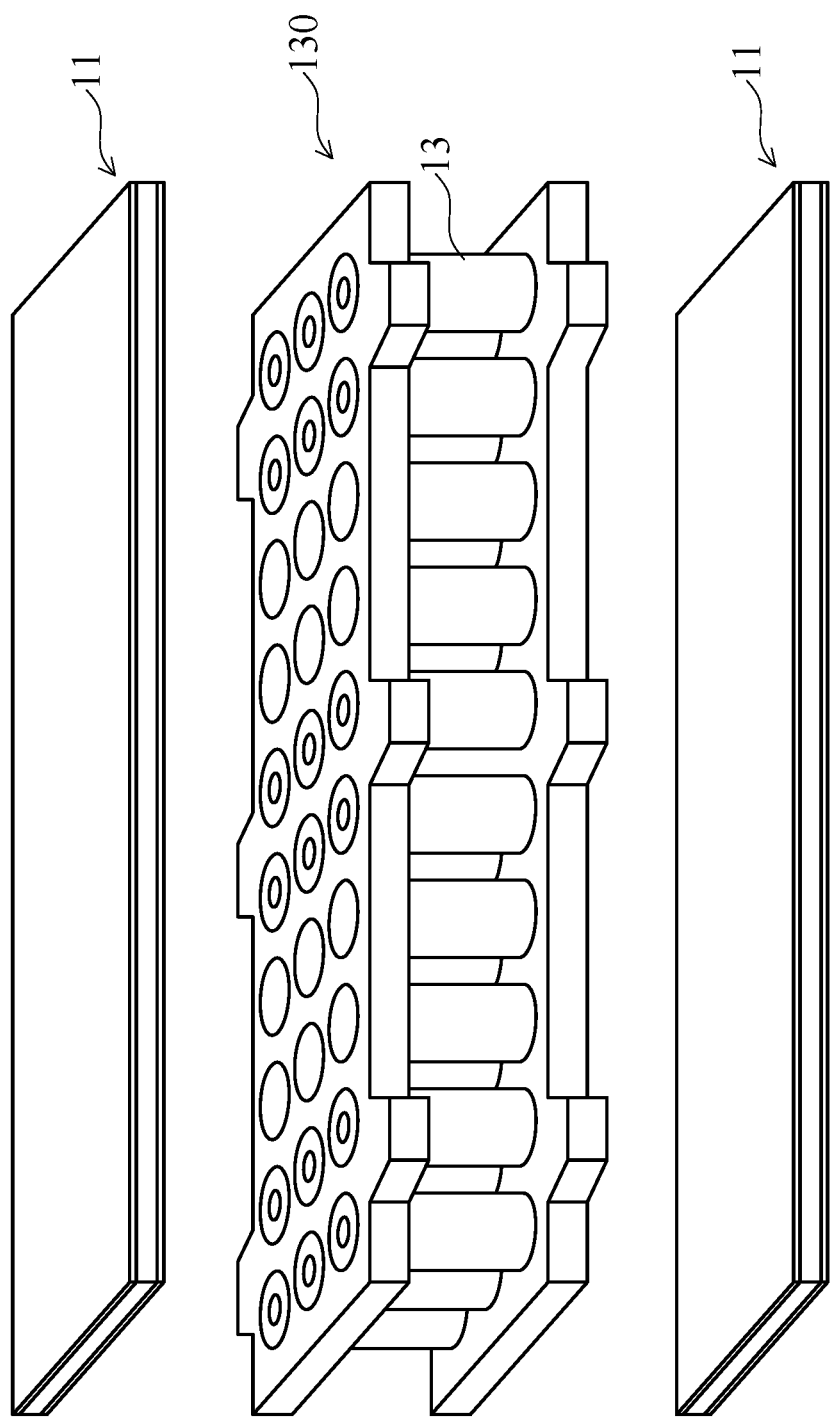
FIG. 1 is a three-dimensional exploded view of a battery device according to one embodiment of the disclosure.
Figure 2:
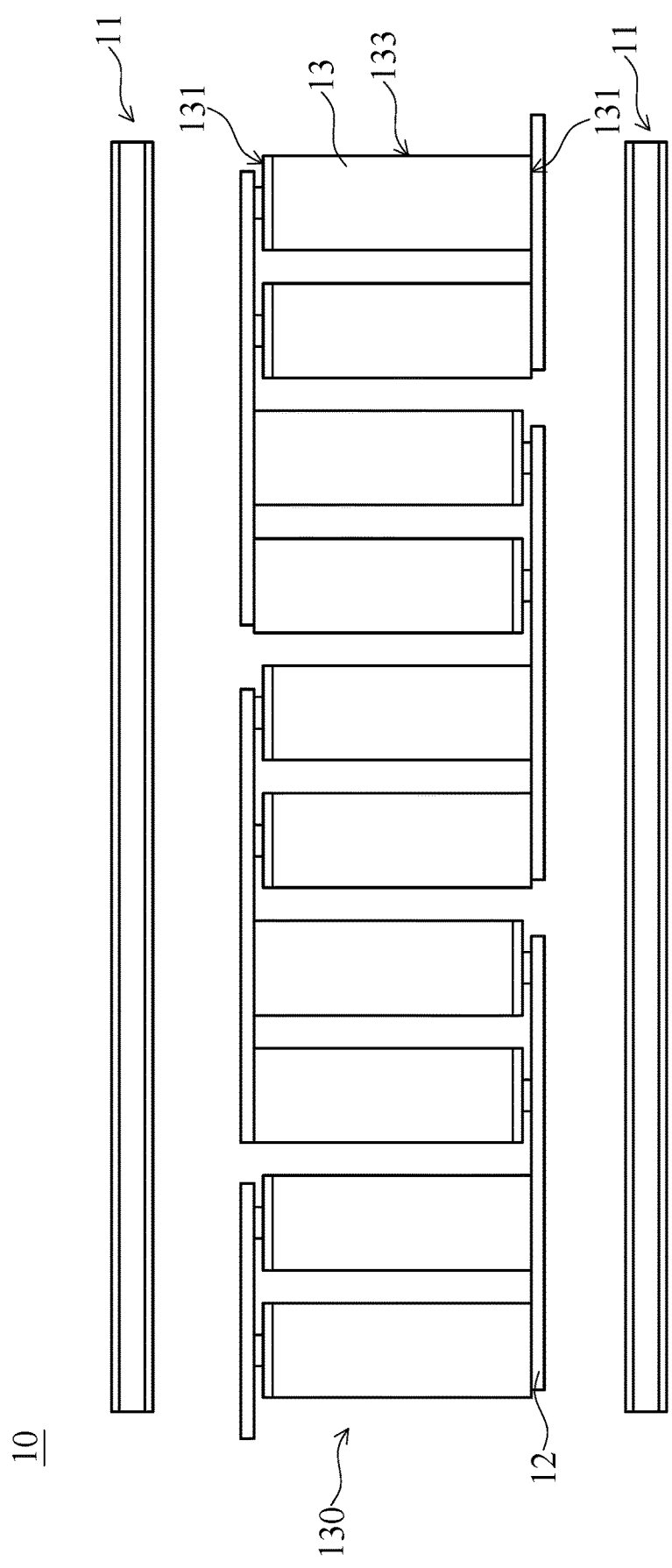
FIG. 2 is a side exploded view of the battery device according to one embodiment of the disclosure.
Figure 3:
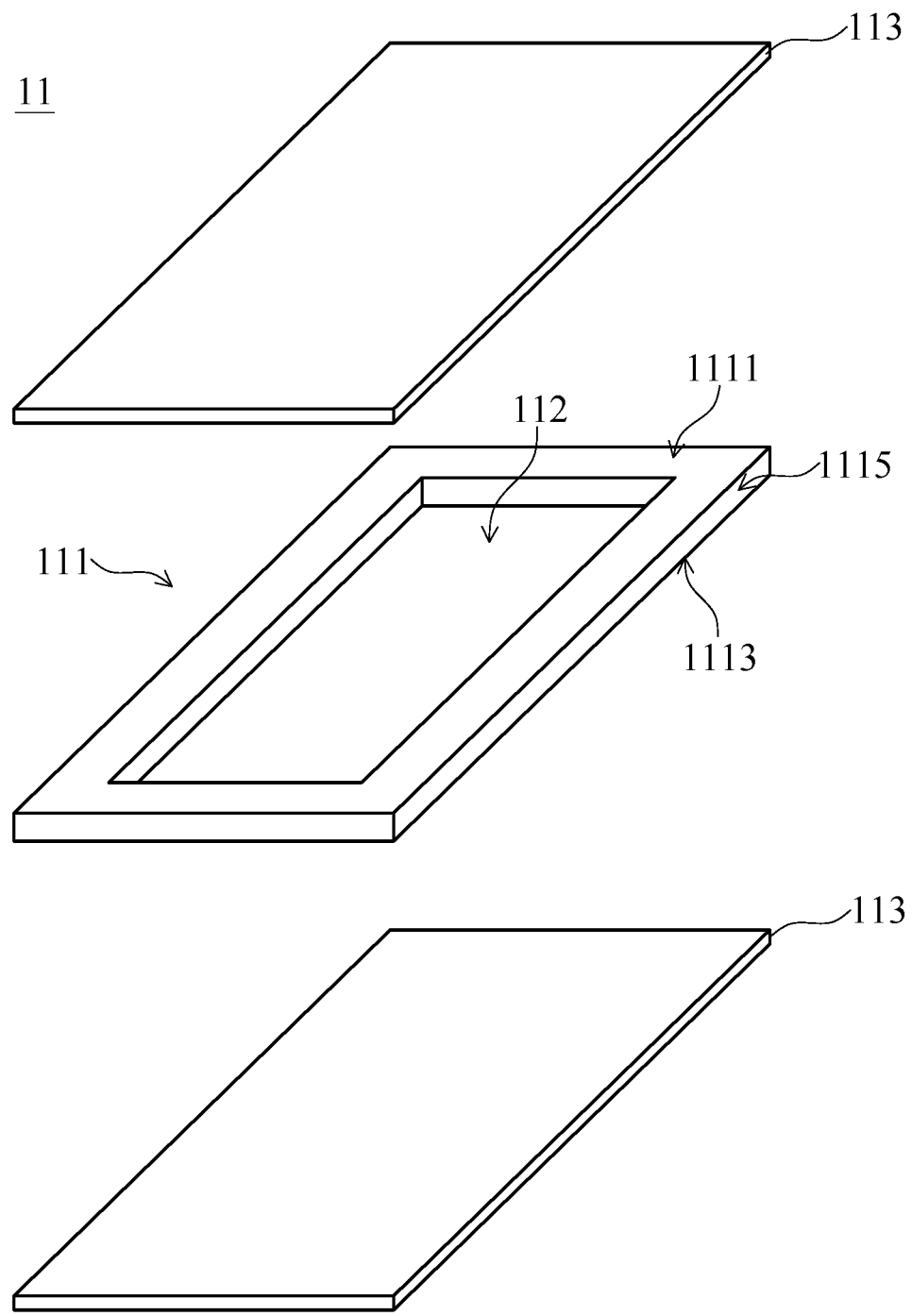
FIG. 3 is a three-dimensional exploded view of a heat dissipation container of the battery device according to one embodiment of the disclosure.
Figure 4:
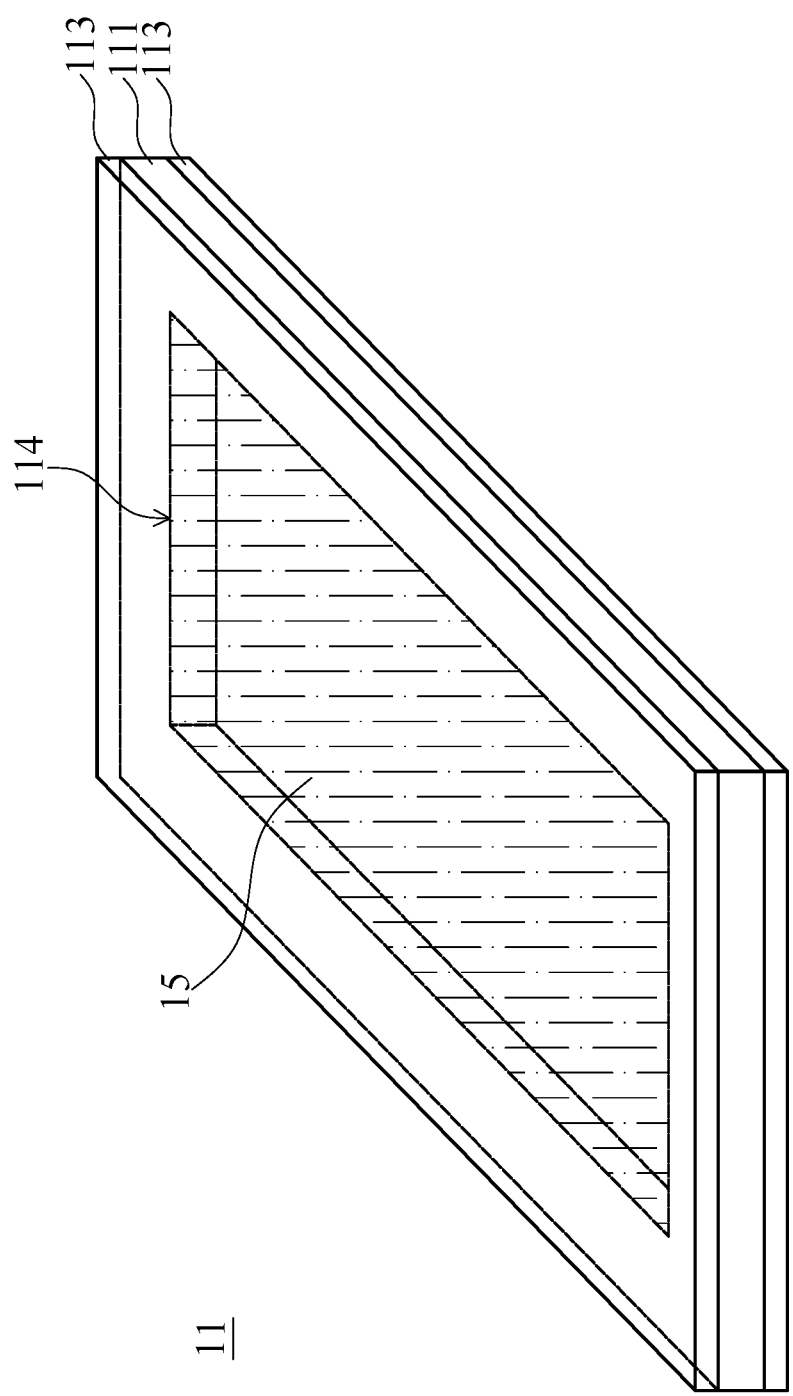
FIG. 4 is a three-dimensional perspective view of the heat dissipation container of the battery device according to one embodiment of the disclosure.

Referring to FIG. 1 and FIG. 2, there are shown a three-dimensional exploded view and a side exploded view of a battery device according to one embodiment of the disclosure. Referring to FIG. 3 and FIG. 4, there are shown a three-dimensional exploded view and a three-dimensional perspective view of a heat dissipation container of the battery device according to one embodiment of the disclosure. As shown in these figures, the battery device 10 is having a thermal protection mechanism, and comprises at least one heat dissipation container 11 and a plurality of battery cells 13. The at least one heat dissipation container 11 is adjacent to the battery cells 13. For example, the heat dissipation container 11 may be located at both ends of the battery cells 13.

As shown in FIG. 3 and FIG. 4, the heat dissipation container 11 comprises a frame 111 and two thin films 113. The frame 111 comprises a perforation portion 112. The two thin films 113 are disposed on two surfaces of the frame 111, and used for covering the perforation portion 112 so as to form an enclosed space 114 between the frame 111 and the thin films 113.

A liquid 15 is disposed in the enclosed space 114. The liquid 15 is water or aqueous solution. In one embodiment of the disclosure, the liquid 15 only occupies part of the enclosed space 114, and the other enclosed space 114 is not placed with the liquid 15. The liquid 15 can flow in the enclosed space 114, and located at the bottom of the enclosed space 114 under the gravity. Besides, gas or water vapor may exist in the enclosed space 114 where the liquid 15 is placed. In another embodiment of the disclosure, the enclosed space 114 can also be filled with the liquid 15.

Specifically, the frame 111 comprises a first surface 1111, a second surface 1113, and a side surface 1115 connected to the first surface 1111 and the second surface 1113. The two thin films 113 are connected the first surface 1111 and the second surface 1113 of the frame 111, respectively. For example, the thin films 113 can be disposed on the first surface 1111 and the second surface 1113 of the frame 111 by gluing, welding or soldering so as to form a rectangular heat dissipation container 11. In other embodiment, the thin films 113 may be adhesive tapes, and attached to the first surface 1111, the second surface 1113, and may be the side surface 1115 of the frame 111.

In another embodiment of the disclosure, the perforation portion 112 of the frame 111 may be a recessed portion, and the number of the thin film 113 is one. The thin film 113 can be used for covering the recessed portion on the frame 111 so that the enclosed space 114 can be formed in the recessed portion. The frame 111 can be made of a metal material with high thermal conductivity, such as aluminum or copper. The frame 111 is connected to the battery cells 13 via the thin film 113 so that the heat generated by the battery cells 13 in charging or discharging can be conducted to the frame 111 and the liquid 15, and therefore the temperature of the battery cells 13 can be reduced.

As shown in FIG. 2, the body of the battery cells 13 comprises two bottom surfaces 131 and a lateral surface 133 located between the two bottom surfaces 131. The appearance of the battery cell 13 is a cylindrical body. One of the bottom surfaces 131 of the battery cells 13 may be a positive electrode, and the other bottom surface 131 or/and the lateral surface 133 may be a negative electrode.

The battery cells 13 are connected together in series or parallel via a plurality of conductive sheets 12 to form a battery module 130. In one embodiment of the disclosure, the number of the at least one heat dissipation container 11 is two; the two heat dissipation containers 11 are adjacent to the two bottom surfaces 131 of the battery cell 13, respectively. In one embodiment of the disclosure, the number of the at least one heat dissipation container 11 is one; the heat dissipation container 11 is adjacent to one of the two bottom surfaces 131 of the battery cells 13.

Specifically, the thin film 113 of the heat dissipation container 11 is adjacent to the corresponding bottom surface 131 of the battery cells 13; otherwise, the conductive sheets 12 are located between the bottom surfaces 131 of the battery cells 13 and the thin film 113 of the heat dissipation container 11. For example, the positive electrodes and/or the negative electrodes of the battery cells 13 can directly contact the corresponding thin film 113 of the heat dissipation container 11, or the positive electrodes and/or the negative electrodes of the battery cells 13 contact the corresponding thin film 113 of the heat dissipation container 11 via the conductive sheets 12. When thermal runaway occurs in the battery cell 13, a high temperature gas is usually ejected from a valve on one of the bottom surfaces 131 (such as the positive electrode) of the battery cell 13, and therefore contacts the thin film 113 of the heat dissipation container 11.

After contacting the high temperature gas, the thin film 113 will damage to generate a broken hole, the liquid 15 in the enclosed space 114 is sprayed or flows out of the heat dissipation container 11 via the broken hole on the thin film 113. The liquid 15 sprayed out of the heat dissipation container 11 will contact the battery cell 13 in the thermal runaway to reduce the temperature of the battery cell 13 in the thermal runaway.

In one embodiment of the disclosure, a water absorbing layer (such as porous metal or porous ceramics) is disposed in the enclosed space 114, and used to absorb the liquid 15. When the thin film 11 has damaged, part of the liquid 15 is sprayed or flows from the heat dissipation container 11 via the broken hole on the thin film 113, and directly contacts the battery cell 13 in the thermal runaway. The liquid 15 remained in the heat dissipation container 11 will be absorbed by the water absorbing layer.

The liquid 15 absorbed by the water absorbing layer will continue to absorb the heat generated by the thermal runaway battery cell 13, and it' state is changed from a liquid state to a gaseous state. The heat of vaporization of water is 40.8 kJ/mol, which is equal to 2,260 kJ/kg. Water can be converted into water vapor by absorbing a large amount of heat generated by the thermal runaway battery cell 13. Therefore, the liquid 15 in the heat dissipation container 11 is preferably water or aqueous solution.

Generally, the temperature of the battery cell 13 in thermal runaway is usually between 160° C. and 240° C. In the disclosure, the thickness and material of the thin film 113 can be adjusted appropriately in order to make that the thin film 113 can be damaged to generate the broken hole between 160° C. and 240° C. In one embodiment of the disclosure, the thin film 113 can be a metal thin film or a plastic thin film. Wherein the metal thin film includes a laminate structure composed of at least one metal layer and at least one plastic layer. For example, the laminate structure is composed of aluminum foil and polyethylene, and connected to the thin film 113 and the frame 111 by a hot pressing procedure.

Furthermore, when the battery module 130 comprises the plurality of battery cells connected in series, a temperature difference will generate on both sides of the battery module 130 during the charging or the discharging. As shown in FIG. 2, the temperature of the battery cells 13 on the left side of the battery module 130 is lower than that of the battery cells 13 on the right side of the battery module 130. Thus, after many times of charging or discharging, the aging speed of the battery cells 13 on the right side of the battery module 130 will be faster than that of the battery cells 13 on the left side of the battery module 130.

In the embodiment of the disclosure, the heat on the high temperature battery cells 13 can be not only conducted to the low temperature battery cells 13 via the frame 111, but also conducted to the liquid 15 in the enclosed space 114 via the frame 111 and/or the thin film 113. Specifically, the temperature of the liquid 15 at the right side of the enclosed space 114 is higher than that of the liquid 15 at the left side of the enclosed space 114 so that the liquid 15 generates a convection in the enclosed space 114, and therefore the temperature of each of the battery cells 13 can be balanced to prolong the service life of the battery module 130.

Figure 5:
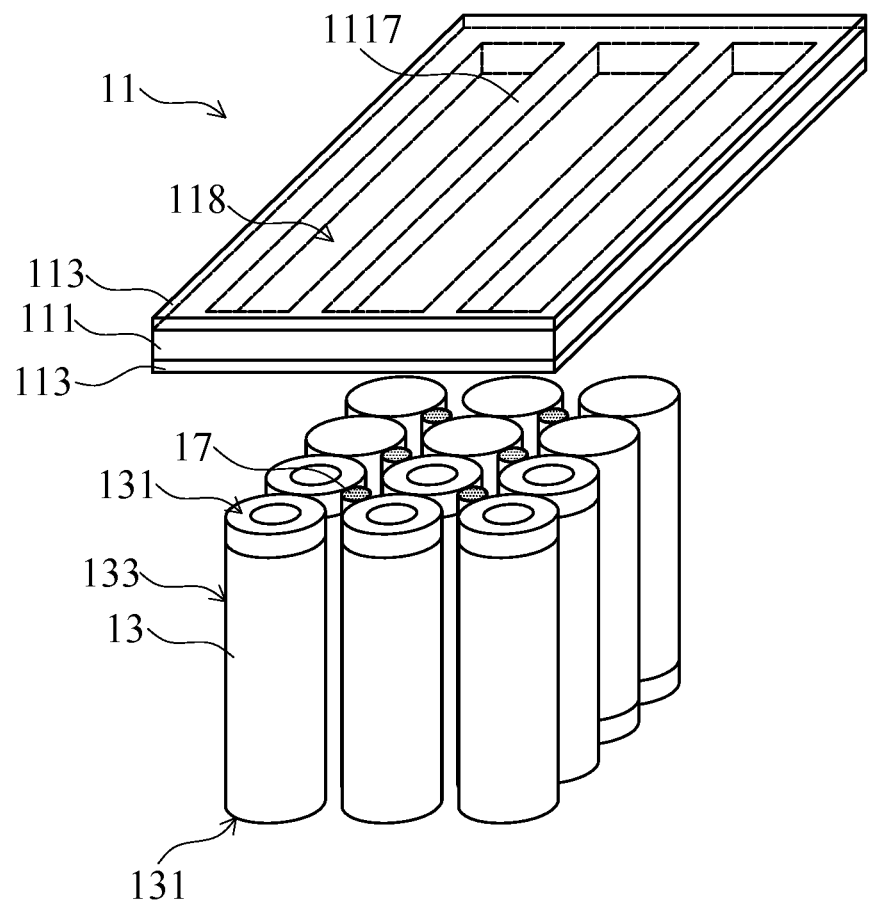
FIG. 5 is a three-dimensional exploded view of the battery device according to another embodiment of the disclosure.

As shown in FIG. 5, the frame 111 of the heat dissipation container 11 further comprises at least one connecting bracket 1117. The connecting bracket 1117 is located in the perforation portion 112 or the recessed portion 116. The enclosed space 114 formed between the frame 111 and the thin film 113 is divided into a plurality of accommodating spaces 118 via the connecting bracket 1117. The thin film 113 is connected to the frame 111 and the connecting bracket 1117.

In one embodiment of the disclosure, the battery cells 13 are arranged in a matrix form, and at least one heat conduction unit 17 is located between the lateral surfaces of the adjacent battery cells 13. Wherein the heat conduction unit 17 is against the connecting bracket 1117, the battery cells 13 are against the accommodating space 118. For example, the heat conduction unit 17 may be a circular, quadrangular or polygonal metal cylinder. The heat conduction unit 17 is provided with one end or two ends thereof connected to the at least one connecting bracket 1117 of the at least one frame 111. The heat generated by the battery cells 13 can be conducted to the heat conduction unit 17 via the lateral surfaces 133 of the battery cells 13, and further can be conducted to the at least one connecting bracket 1117 of the at least one frame 111 via the one end or two end of the heat conduction unit 17.

Figure 6:
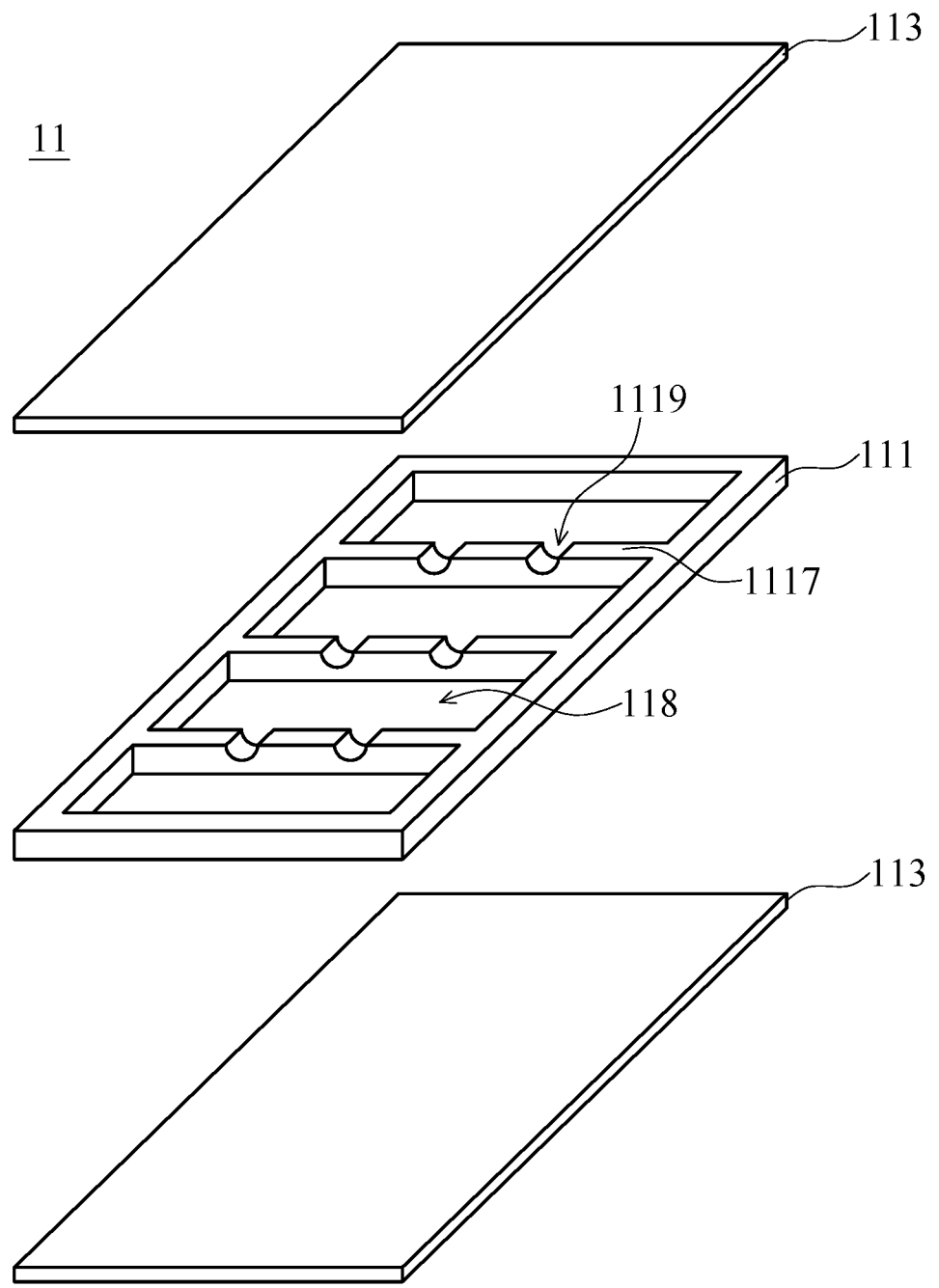
FIG. 6 is a three-dimensional exploded view of the heat dissipation container of the battery device according to another embodiment of the disclosure.

As shown in FIG. 6, the connecting bracket 1117 of the frame 111 is provided with at least one concave portion 1119 or at least one connection hole, and connected to the accommodating spaces 118 located the two sides of the connecting bracket 1117 via the concave portion 1119 or the connection hole.

Figure 7:
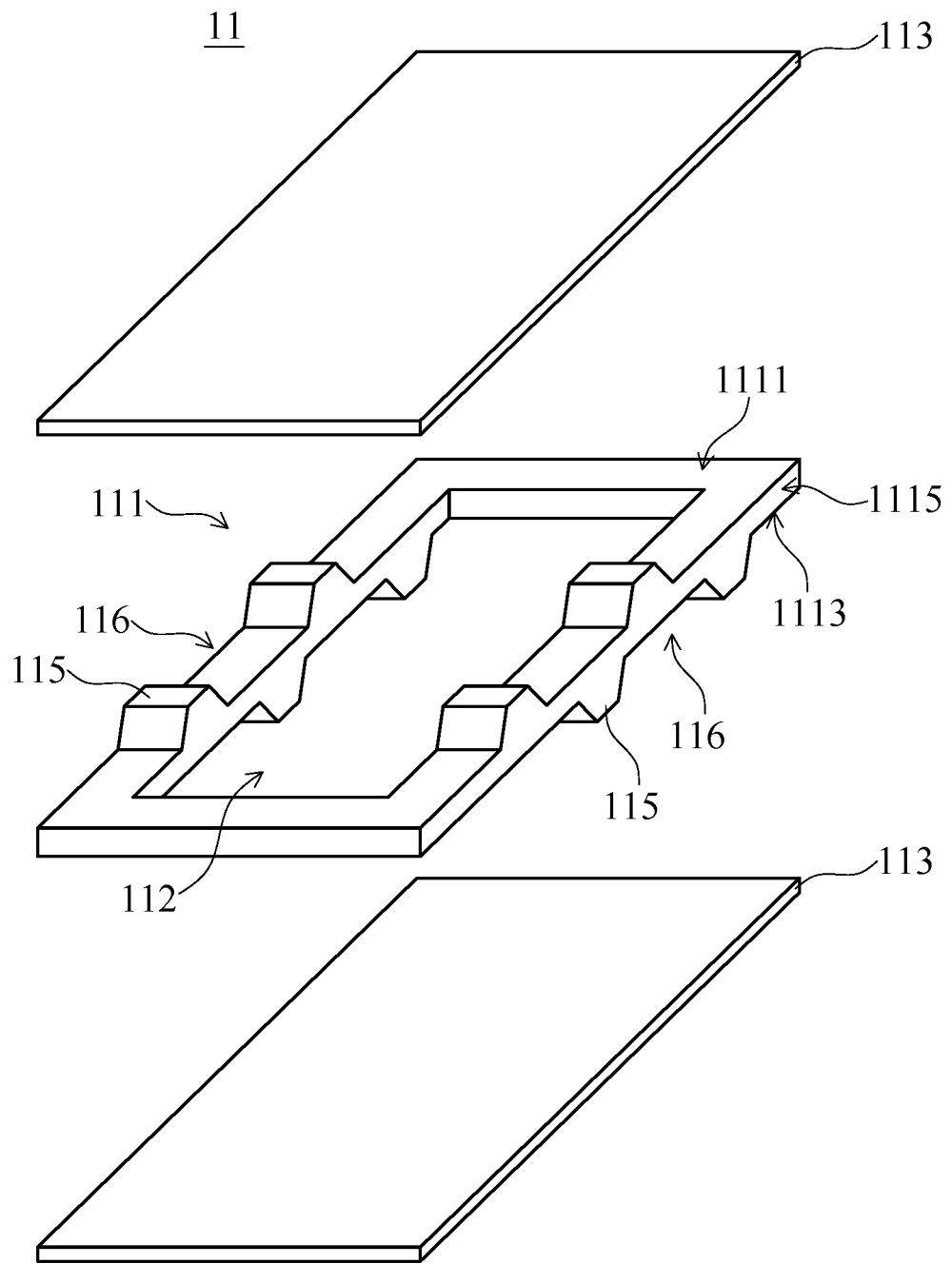
FIG. 7 is a three-dimensional exploded view of the heat dissipation container of the battery device according to another embodiment of the disclosure.
Figure 8:
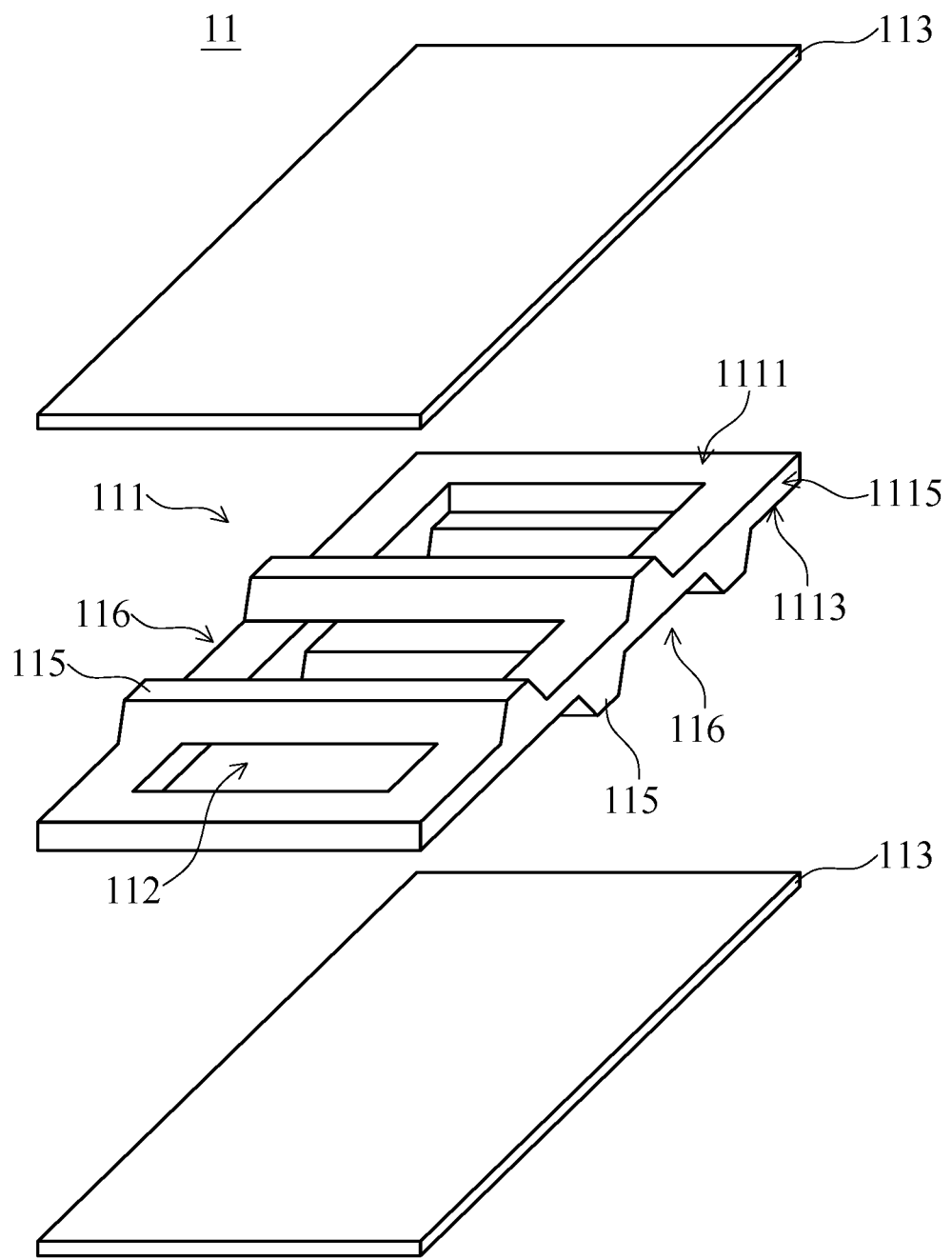
FIG. 8 is a three-dimensional exploded view of the heat dissipation container of the battery device according to another embodiment of the disclosure.

As shown in FIG. 7, the frame 111 comprises plurality of raised portions 115. A recessed portion 116 is formed between the adjacent raised portions 115. In one embodiment of the disclosure, the raised portions 115 are formed on the first surface 1111 and the second surface 1113 of the frame 111. The raised portions 115 on the first surface 1111 are interleaved with the raised portions 115 on the second surface 1113 each other. As shown in FIG. 8, the raised portions 115 located at two sides of the frame 111 can be configured across the perforation portion 112, and formed as column-shaped raised structure between the two sides of the perforation portion 112.

The two thin films 113 are connected to the first surface 1111 and the second surface 1113, respectively, to form an enclosed space 114 between the two thin films 113 and the frame 111. Besides, one of the two thin films 113 is connected to the first surface 1111 of the frame 111 and the raised portions 115 on the first surface 1111 of the frame 115, and the other thin film 113 is connected to the second surface 1113 of the frame 111 and the raised portions 115 on the second surface 1113 of the frame 111.

Figure 9:
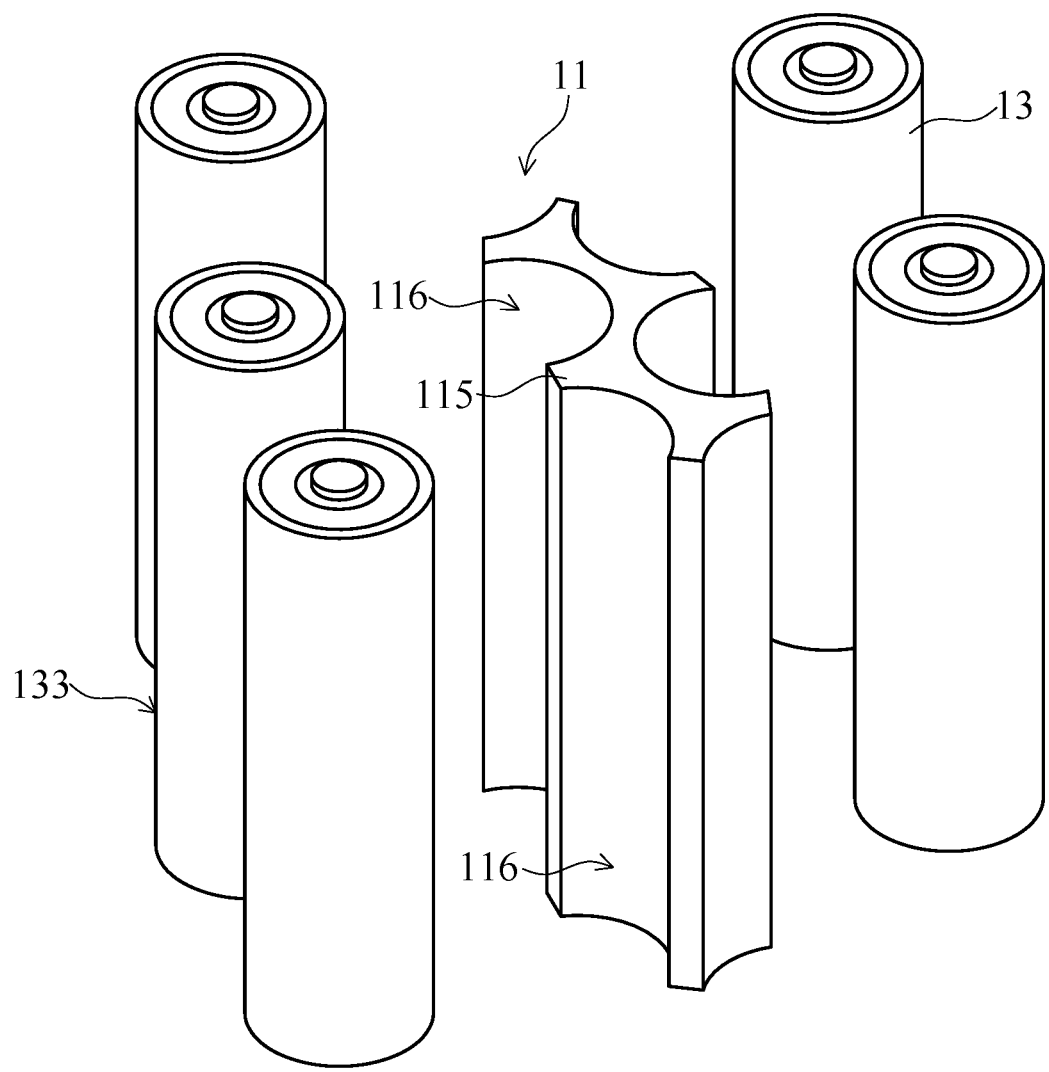
FIG. 9 is a three-dimensional exploded view of a battery device according to another embodiment of the disclosure.

In the above embodiment of the disclosure, the heat dissipation container 11 is disposed on the corresponding bottom surface 131 of the battery cell 13 so that the thin film 113 of the heat dissipation container 11 is adjacent to the bottom surfaces 131 of the battery cells 13. As shown in FIG. 9, in another embodiment of the disclosure, the heat dissipation container 11 can be disposed between the adjacent battery cells 13. Wherein the thin films 113 of the heat dissipation container 11 contact the lateral surfaces 133 of the battery cells 13. Each of the battery cells 13 is placed in the corresponding recessed portion 116 to make that the lateral surface 133 of each of the battery cells 13 is located within the corresponding recessed portion 116, and the raised portion 115 of the heat dissipation container 11 is located between the two adjacent battery cells 13. So, the contact area between the lateral surface 133 of the battery cell 13 and the heat dissipation container 11 can be increased, and the efficiency that the heat generated by the battery cell 13 to be conducted to the heat dissipation container 11 can be improved.

In practical application, the battery module 130 may include the plurality of battery cells 13 and the plurality of heat dissipation containers 11. Wherein the heat dissipation containers 11 can be used to fill the gaps between the adjacent battery cells 13 as much as possible to make that the lateral surface 133 of each of the battery cells 13 can contact the at least one heat dissipation container 11, and therefore the effect of heat dissipation to the battery module 130 can be increased.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A battery device having thermal protection mechanism, comprising:
   a plurality of battery cells, wherein each of the plurality of battery cells is provided with two bottom surfaces and a lateral surface located between the two bottom surfaces;
   at least one heat dissipation container, adjacent to the plurality of battery cells, comprising:
   a frame comprising at least one perforation portion or a recessed portion, wherein the frame is provided with a first surface;
   at least one thin film, connected to the first surface of the frame, and used for covering the at least one perforation portion or the recessed portion so as to form an enclosed space between the at least one thin film and the frame, wherein the at least one thin film is adjacent to at least one of the two bottom surfaces of each of the plurality of battery cells; and
   a liquid placed in the enclosed space of the at least one heat dissipation container, wherein the liquid is water or aqueous solution,
   wherein a plurality of raised portions are configured on the first surface of the frame, and the recessed portion is existed between the adjacent raised portions; the at least one thin film is connected to the first surface of the frame and the raised portions on the first surface of the frame.

2. The battery device according to claim 1, wherein the frame is provided with a second surface, and a side surface connected to the first surface and the second surface; the number of the at least one thin film is two; the two thin films are connected to the first surface and the second surface of the frame, respectively.

3. The battery device according to claim 1, wherein at least one connecting bracket is connected to the frame, the enclosed space formed between the frame and the at least one thin film is divided into a plurality of accommodating spaces via the at least one connecting bracket.

4. The battery device according to claim 3, wherein the connecting bracket is provided with a concave portion or a connection hole thereon, and communicated with the plurality of accommodating spaces located at two sides of the at least one connecting bracket via the concave portion or the connection hole.

5. The battery device according to claim 4, wherein at least one heat conduction unit is located between the lateral surfaces of the plurality of adjacent battery cells, the at least one heat conduction unit is against the connecting bracket, the plurality of battery cells are against the plurality of accommodating spaces.

6. The battery device according to claim 1, wherein the plurality of battery cells are connected in series or parallel via a plurality of conductive sheets, which are located between the bottom surfaces of the plurality of battery cells and the at least one thin film of the at least one heat dissipation container.

7. The battery device according to claim 1, where the at least one thin film comprises at least one metal layer and at least one plastic layer.

8. A battery device having thermal protection structure, comprising:
   a plurality of battery cells, wherein each of the plurality of battery cells is provided with two bottom surfaces and a lateral surface located between the two bottom surfaces;
   at least one heat dissipation container, adjacent to the plurality of battery cells, comprising:
   a frame comprising at least one perforation portion, wherein the frame is provided with a first surface, a second surface, and a side surface connected to the first surface and the second surface;
   two thin films, connected to the first surface and the second surface of the frame, respectively, and used for covering the at least one perforation portion to form an enclosed space between the two thin films and the frame, wherein the two thin films contact the lateral surfaces of the plurality of battery cells; and
   a liquid placed in the enclosed space of the at least one heat dissipation container, wherein the liquid is water or aqueous solution;
   wherein a plurality of raised portions are configured on the first surface and the second surface of the frame, and a recessed portion is existed between the adjacent raised portions; one of the two thin films is connected to the first surface of the frame and the raised portions on the first surface of the frame, and the other thin film is connected to the second surface of the frame and the raised portions on the second surface of the frame.

9. The battery device according to claim 8, wherein each of the plurality of battery cells is located in the corresponding recessed portion, each of the raised portions of the at least one heat dissipation container is located between the plurality of adjacent battery cells.

10. The battery device according to claim 8, where each of the two thin films comprises at least one metal layer and at least one plastic layer.

* * * * *